March 17, 1970  W. R. HOYLE  3,500,683
METHODS AND APPARATUS FOR INTERPRETING
SHALY-SAND EARTH FORMATIONS Original Filed Nov. 9, 1965  4 Sheets-Sheet 1

William R. Hoyle
INVENTOR.

BY Richard E. Bee
ATTORNEY

William R. Hoyle
INVENTOR.

William R. Hoyle
INVENTOR.

BY Richard E. Bee
ATTORNEY

United States Patent Office 3,500,683
Patented Mar. 17, 1970

3,500,683
METHODS AND APPARATUS FOR INTERPRETING SHALY-SAND EARTH FORMATIONS
William R. Hoyle, Redding, Conn., assignor to Schlumberger Technology Corporation, New York, N.Y., a corporation of Texas
Continuation of application Ser. No. 510,137, Nov. 9, 1965. This application May 13, 1968, Ser. No. 733,214
Int. Cl. E21b 49/00
U.S. Cl. 73—152                       17 Claims

ABSTRACT OF THE DISCLOSURE

In accordance with illustrative embodiments of the invention, methods and apparatus for determining certain characteristics of earth formations are disclosed. More particularly, measurements representative of the bulk density and acoustic velocity or travel time of a formation are obtained from one or more runs in a borehole. These measurements are then combined in a desired manner to arrive at the percentage of sand or shale and porosity of the formation under investigation. This information is useful in determining the presence of hydrocarbons in the formation.

---

This application is a continuation of applicant's copending application Ser. No. 510,137 and now abandoned, filed Nov. 9, 1965, which is in turn a continuation-in-part of applicant's copending application Ser. No. 236,314 and now abandoned, filed Nov. 8, 1962, and entitled "Method of Interpreting Sand-Shale Laminae."

This invention relates to logging methods for wells or boreholes to determine formation parameters and, more particularly, to methods and apparatus for determining the shale fraction parameter in shale and sand laminated strata as well as the effective porosity of sand and shale laminated strata.

Logging instruments are available to obtain logs of (a) the bulk density of formations, (b) the travel time of acoustic pulses through the formations between spaced locations, and (c) the true resistivity ($R_t$) of the formations. Heretofore, although such log data has been available, there has been no easy way of evaluating complex matrix conditions such as the case where sand and shale laminae occur in alternate layers and there is substantially no dispersion of one within the other.

Accordingly, it is an object of the present invention to provide simple and accurate methods and apparatus for evaluating formations comprised of shale or clay and sand.

The present invention involves the logging of a well bore wherein representative traces coordinated with depth are obtained, these traces including:

(1) A trace of velocity relates travel time characteristics of the formation surrounding the well bore, and (2) A trace of the bulk density characteristics of the formation surrounding the well bore. In one form of the invention, correlated points from these traces are obtained to determine the percentage of clay or shale and the porosity of a sand and shale laminated formation by a simple graphical solution method wherein cross-correlation of measurements of a single parameter by different tools provides an interpretation of such sand and shale laminated formations which heretofore have not been possible.

In another form of the invention, signals representative of the bulk density and acoustic travel time of the formation are combined in a given relationship to provide signals representative of the shale or clay content and porosity of the formations.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

Figures 1, 2, 3:
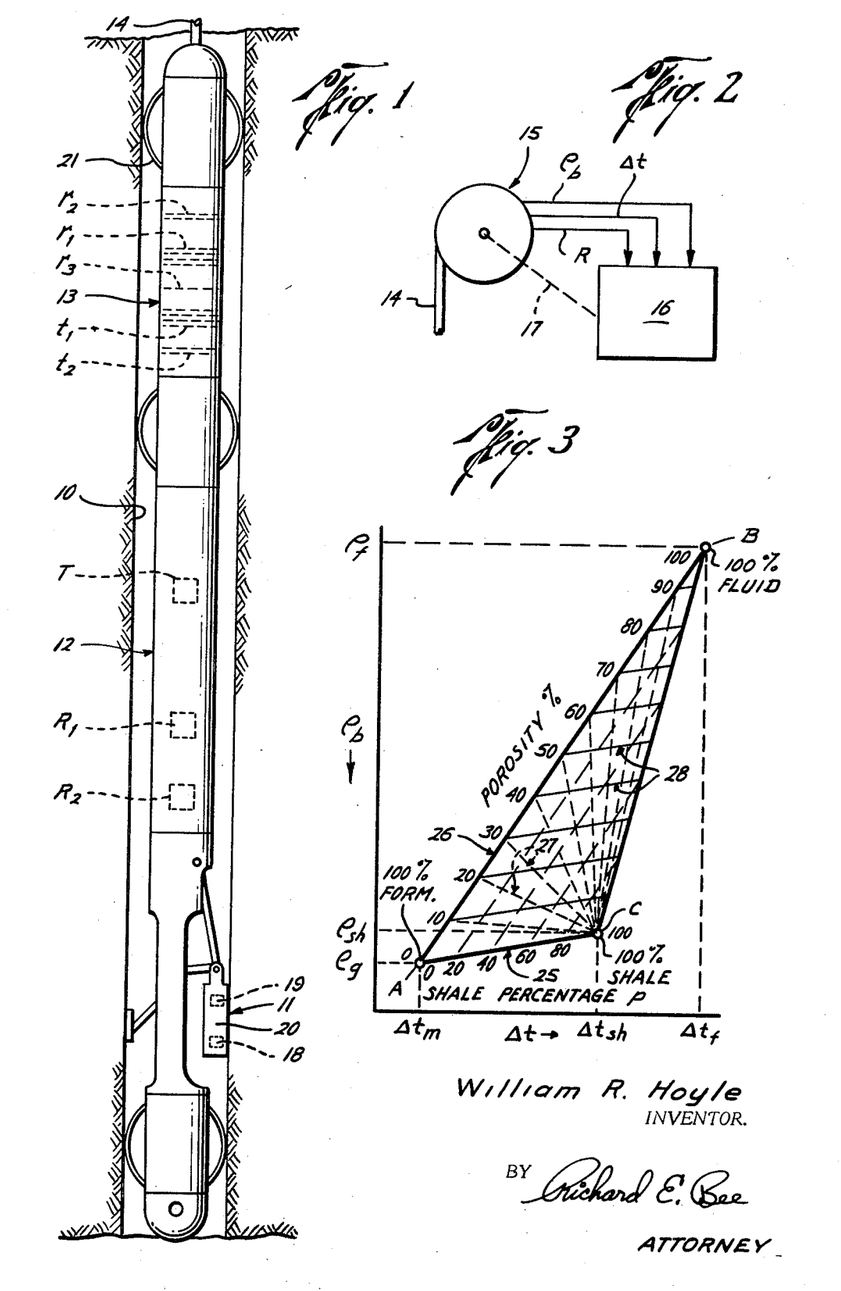
FIGURES 1 and 2 are views of apparatus for use with the present invention.
FIGURE 3 is a chart in which the present invention is embodied.

The diagrammatic showing in FIGURE 1 indicates a well or borehole at 10 traversing various subsurface strata or earth formations. The apparatus schematically shown includes a gamma-gamma formation density logging device 11, an acoustic travel time or velocity measuring device 12, and an induction logging device 13 suspended in the borehole 10 by an armored multiconductor cable 14. Such devices may be either combined as a single unit or individually used with suitable depth control measurements for correlation of logs.

At the earth's surface, the cable 14 is spooled on winch 15 (FIGURE 2) in a conventional manner. The electrical conductors of the cable are connected to a recorder 16 which in the usual manner produces separate traces on a film or chart representing measurements made by the respective tools. The recorder 16 is synchronized in a conventional manner as indicated by the dashed line 17 to move the chart as the traces are made with a displacement proportional to the cable movement. Since the tools as shown in FIGURE 1 are at different depths, the recorder is provided with memorizers (not shown) operating in a well-known manner to bring the indications representing the measurements at each given depth into correspondence on the recorder chart or log.

The formation density device 11 (FIGURE 1) includes a gamma ray source 18 and detector 19 mounted in a skid 20 which, during the logging operation, is in contact with the wall of the borehole 10. Gamma rays are emitted by the source 18 and diffuse through the earth formations. The detector 19 samples the number of diffused gamma rays returning at a fixed spacing from the source 18. An increase in counting rate by the detector 19 indicates a decrease in bulk density in front of the skid unit. Conversely, a decreased counting rate signifies an increase in bulk density. The measurements of the detector are supplied to the recorder 16 and provide an indication of bulk density values. The recorded bulk density values, after appropriate borehole and mudcake corrections, provide a bulk density measurement of the formations.

From bulk density measurements, porosity may be computed using the following well-known expression:

$$\phi_e = \frac{\rho_g - \rho_b}{\rho_g - \rho_f} \quad (1)$$

where
$\phi$ = formation porosity
$\rho_g$ = grain density of the formation matrix material
$\rho_b$ = bulk density of formation as determined from the log
$\rho_f$ = density of fluid occupying the pore space.

With respect to the Equation 1, the matrix characteristics, i.e., $\rho_g$ and $\rho_f$ values are known with sufficient accuracy from knowledge of the lithology of the formations under study. For example, a grain density $\rho_g$ of 2.65 grams per cubic centimeter is a broadly applicable matrix value for sandstones while the density $\rho_f$ of the fluid occupying the pore space is generally assumed to be unity (one gram per cubic centimeter) in wells drilled with an aqueous mud.

The acoustic velocity measuring tool 12 comprises a transmitter T and spaced receivers $R_1$, $R_2$, the receivers respectively detecting the arrival of an acoustic impulse emitted from the transmitter. The time interval $\Delta t$ between arrivals at the receivers is recorded versus depth as a value on the recorder chart and provides a measurement from which porosity can be determined by use of the following well-known expression:

$$\phi = \frac{\Delta t - \Delta t_m}{\Delta t_f - \Delta t_m} \quad (2)$$

where
$\phi$ = formation porosity
$\Delta t$ = travel time of sonic energy through the formations between spaced receivers
$\Delta t_f$ = travel time of sonic energy through the fluid or liquid in the formation pore space (calculated from a typical fluid velocity of 5,300 feet per second)
$\Delta t_m$ = the travel time of sonic energy through the formation matrix material.

The induction logging device 13 comprises a set of transmitter coils $t_1$ and $t_2$ and a set of receiver coils $r_1$ $r_2$ and $r_3$ for measuring the electrical resistivity of the adjacent earth formation material. The transmitter coils $t_1$ and $t_2$ are energized with alternating current to induce a circular flow of electrical current around the borehole in the adjacent earth material. This induced current, in turn, induces a voltage signal in the receiver coils $r_1$, $r_2$ and $r_3$. The magnitude of this voltage signal is proportional to the magnitude of the current flow in the adjacent earth material and, hence, is proportional to the electrical conductivity of such earth material. This conductivity signal represented by the receiver coil voltage is converted to a resistivity signal by means of an appropriate circuit for taking the reciprocal of the conductivity signal. The resulting resistivity signal is then recorded on the recorder 16 as a function of borehole depth. The use of multiple transmitter and receiver coils provides a desirable vertical focusing action so that the induction log measurement will correspond to a relatively narrow vertical interval of the formation material.

The resistivity of sand laminae can be obtained from solution of the following formula:

$$\frac{1}{R_t} = \frac{p}{R_{sh}} + \frac{1-p}{R_{sd}} \quad (3)$$

where
$R_t$ = true resistivity of the shaly sand zone
$R_{sh}$ = shale resistivity, obtained from shale zones near the zone under study
$R_{sd}$ = resistivity of the sand phase of the zone
$p$ = fractional amount of shale in the zone.

The value of $R_{sh}$ and $R_t$ may be determined from the induction log measurements on nearby clean shales and on the bed under study, leaving only the values of $p$ and $R_{sd}$ to be determined.

The present invention is concerned with determining the shale fraction $p$ to permit evaluation of sand and shale laminae. Effective porosity of the sand and shale laminae is also determined by the method of this invention.

It has been found in shale and sand laminated formations that the porosity values ($\phi$) as determined (Equation 2) from the trace measurements of the acoustic velocity measuring tool are different from porosity values ($\phi$) as determined (Equation 1) from the trace measurements of the formation density tool. While the formation density device gives a more accurate measurement of effective porosity because it is not influenced by the presence of shale, it does give a porosity value which is too low in value. The presence of shale in a sand tends to increase the measured travel time $\Delta t$, hence, the porosity determined solely from the velocity measuring tool in such instances is too high in value. However, in accordance with the present invention, the acoustic velocity measurements can be combined with the formation density measurements to obtain in a rapid and easy manner an effective porosity value and a determination of the shale percentage $p$.

Combining the velocity and formation density measurements may be, in accordance with the present invention, performed by computers as will hereinafter become more apparent. In preference, however, to such automatic procedures, applicant has devised a simple, time saving and rapid method of determining effective porosity and shale percentage.

In the present invention, a graph is used having coordinate axes where one axis represents travel time and the other axis represents bulk density measurements. On the graph is a triangular plot of lines wherein one line represents porosity values, one line represents shale fraction values and radial lines emanating from a 100% shale point extend to porosity values on the porosity line.

With the graph, it is easily determined from measurements of travel time and bulk density values what the porosity and shale percentage of a selected formation is, such values being correlated to provide more accurate evaluation of the selected formation.

To more clearly understand the present invention, some basic relationships will now be explained.

RELATIONSHIP OF POROSITY AND BULK DENSITY

In a laminated shaly sand containing a fractional amount $p$ of shales, the following expression can be written:

$$\rho_b = p\rho_{sh} + (1-p)\rho_{sd} \quad (4)$$

where $\rho_{sd}$ and $\rho_{sh}$ are the bulk densities of the sand and shale laminations respectively, and $\rho_b$ is the measured bulk density of the formations. $\rho_{sh}$ is determined from measurements on a nearby thick shale zone. The bulk density of a sandstone $\rho_{sd}$ can be expressed in terms of the sand porosity as $\phi_{sd}$ as follows:

$$\rho_{sd} = \phi_{sd} \cdot \rho_f + (1-\phi_{sd})\rho_g \quad (5)$$

where $\rho_g$ and $\rho_f$ are densities of the sand matrix and of the fluid present in the sand porosity respectively and $\phi_{sd}$ is the porosity of the sand. Equation 5 corresponds to Equation 1 rewritten for the sand phase.

Equations 4 and 5 can be combined giving:

$$\rho_b = p\rho_{sh} + (1-p)[\phi_{sd} \cdot \rho_f + (1-\phi_{sd})\rho_g] \quad (6)$$

RELATIONSHIP OF POROSITY AND TRAVEL TIME

Travel time or $\Delta t$ measurements in laminated shaly sand containing a fractional amount $p$ of shales can be expressed as follows:

$$\Delta t = p\Delta t_{sh} + (1-p)\Delta t_{sd} \quad (7)$$

where $\Delta t_{sh}$ and $\Delta t_{sd}$ are travel time values for shale and sand, respectively. The shale travel time value is determined for measurements on a nearby thick shale zone.

The porosity $\phi_{sd}$ of the sand phase can be expressed in terms of travel time as follows:

$$\Delta t_{sd} = \phi_{sd} \cdot \Delta t_f + (1-\phi_{sd}) \cdot \Delta t_m \quad (8)$$

where $\Delta t_m$ is known travel time value for the formation matrix. Equation 8 corresponds to Equation 2 rewritten for the case of the sand phase.

Equations 7 and 8 can be combined giving:

$$\Delta t = p\Delta t_{sh} + (1-p)[\phi_{sd} \cdot \Delta t_f + (1-\phi_{sd}) \cdot \Delta t_m] \quad (9)$$

Equations 6 and 9 can now be combined to give $p$ and $\phi_{sd}$ as a function of the measured values $\rho_b$ and $\Delta t$ and of the known parameters $\Delta t_{sh}$, $\Delta t_m$, $\Delta t_f$, $\rho_{sh}$, $\rho_g$ and $\rho_f$.

The algebraic solution of the two linear Equations 6 and 9 can be performed by conventional computers to provide values of both $p$ and the porosity $\phi_{sd}$. This knowledge of $p$ permits solution of Equation 3 for $R_{sd}$.

However, another technique, of plotting bulk density versus travel time, enables a graphical solution of equations 6 and 9 rather than the computer solutions. FIGURE 3 is an example of such a cross plot.

In FIGURE 3, for consolidated formations, two points are determined by the characteristic density and travel time values of the matrix and fluid materials: Point A, corresponding to 100% sand of zero porosity, is located at a bulk density value equal to the bulk density of a 100% sand and a $\Delta t$ value equal to travel time through 100% matrix material; Point B, the 100% fluid point, is located at a bulk density value equal to the bulk density for 100% fluid and a $\Delta t$ value equal to travel time through 100% fluid. The third point C is a point representing 100% shale. Point C is usually determined from the log for each particular well traversing a clean shale and in some cases for each geological horizon and is fixed by the observed log values for the bulk density and $\Delta t$ of the clean shale formation.

A line 25 connecting A and C is divided into equal portions denoting shale percentages $p$ between 0 and 100. These values of $p$ are projected into the chart parallel to the line 26 between A and B. This line 26 is divided into equal values of porosity between 0 and 100. Dashed lines 27 connecting the equal porosity values on the shale-free or clean-sand line 26 to Point C represent the sand laminae porosity for intermediate points.

Effective porosity $\phi_e$ may be computed from the relationship:

$$\phi_e = \phi_{sd}(1-p) \qquad (10)$$

If desired, lines 28 representing effective porosity can be constructed from line 26 parallel to line 25.

In the method of the present invention, a point A is fixed on a chart having coordinate axes representing bulk density and acoustic travel time values for bulk density and travel time values for a formation of 100% matrix (sand) material. Next, a point B is fixed on the chart for values of bulk density and travel time determined from the functions $$\rho_b = \phi\rho_f + (1-\phi)\rho_g$$

and $$\Delta t = \phi\Delta t_f + (1-\phi)\Delta t_m$$

the bulk density values of $\rho_f$ and $\rho_g$ and the values of $\Delta t_f$ and $\Delta t_m$ being known and the porosity $\phi$ being given an assumed value greater than any porosity value expected to be determined. In FIGURE 3, Point B is plotted for the limiting case of 100% porosity, in which case, the bulk density value is $\rho_f$ and the travel time value is $\Delta t_f$. A Point C is then fixed for values of bulk density and travel time representing a formation of 100% shale material. The line between Points A and C represent shale percentages between 0 and 100, while the line between Points A and B represents porosity values between zero and the assumed maximum porosity value.

Measurement values are then transferred to the chart to obtain an intersection point. The effective porosity is determined by the relationship of an intersecting line between the intersection point and the line between Points A and B, which intersecting line is parallel to the line between Points A and C. The shale percentage is determined by the relationship of an intersecting line between the intersection point and the line between Points A and C, which intersecting line is parallel to the line between Points A and B.

Figure 4:
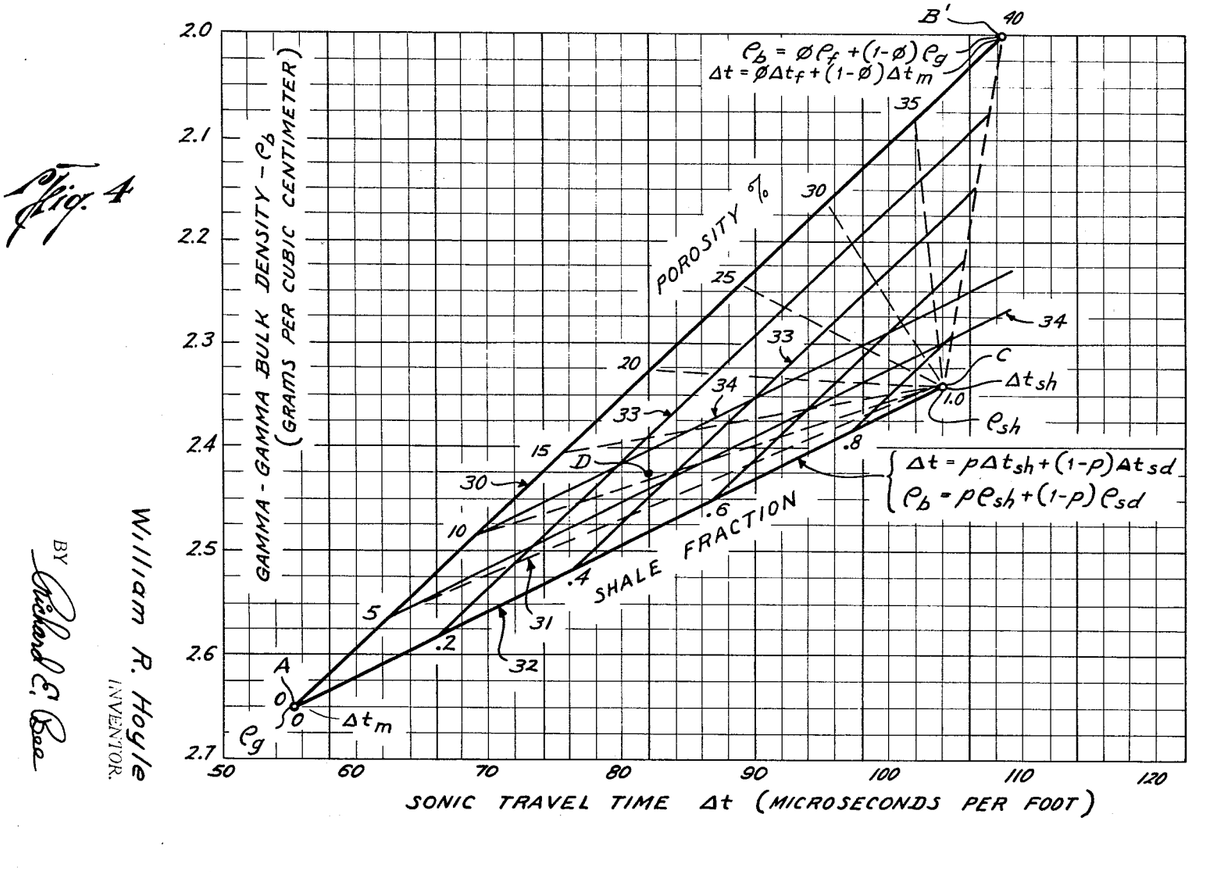
FIGURE 4 is an example of the present invention.

The following example is given to illustrate the system. The following parameters are known:

$\Delta t_{sh} = 104 \mu sec./ft.$
$\Delta t_m = 55.5 \mu sec./ft.$
$\Delta t_f = 188 \mu sec./ft.$
$\rho_{sh} = 2.34$ gm./cm.$^3$
$\rho_g = 2.65$ gm./cm.$^3$ (sand)
$\rho_f = 1.00$ gm./cm.$^3$ The fact that the relationships are linear permits rapid plotting of Points A and C as shown in FIGURE 4.

Since porosity maximums are generally known, $\rho_b$ and $\Delta t$ may be computed for a convenient clean sand porosity slightly greater than the maximum to be expected from Equations 1 and 2. Hence, as shown in FIGURE 4, Point B' can be determined by assuming a porosity value of 40% and determining a $\rho_b$ value of 2.0 and a $\Delta t$ value of 108 from measured values for a clean sand. Connecting the computed Point B' with the zero sand porosity Point A defines the clean sand line 30. Since the relationships are linear, line 30 is divided linearly into porosity units between 0 and 40. Connecting the clean sand porosity units with the shale point C establishes the sand laminae porosity lines 31 (shown as dashed lines). The line 32 connecting the zero sand porosity Point A and the shale Point C is divided linearly into shale fraction units. Lines 33, drawn parallel to the clean sand line 30 through these shale fraction points, establish shale fraction lines. Lines 34 drawn parallel to the shale fraction line 32 from the clean sand porosity units on line 30 establish the effective porosity lines.

If the traces of the chart for a formation of sand and shale laminae show correlated values, for example, of $\Delta t = 82$ microseconds per foot and bulk density=2.425 grams per cubic centimeter, these values transferred to the chart of FIGURE 4 would plot at the Point D. The shale fraction $p$ is then .31 or 31% while the sand laminae porosity is 11%. Effective porosity determined as per Equation 10 is 7.59%. Using lines 34 which extend from the 5 and 10% porosity values, the effective porosity of 7.6% can be determined directly.

With the shale percentage $p$ determined, the true measured resistivity $R_t$ of the formations and the measured resistivity of the shale $R_{sh}$ determined from values of the trace of the induction device, these determined values can be substituted into Equation 3 to ascertain the resistivity of the sand $R_{sd}$. The $R_{sd}$ value can then be used to determine the oil or water saturation in the sand.

Figure 5:
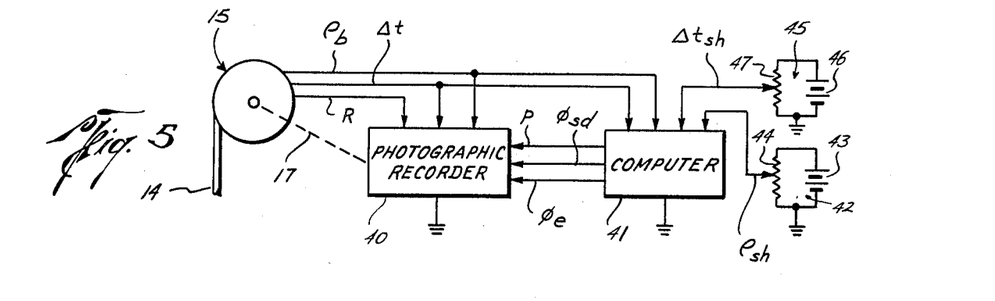
FIGURE 5 shows a modified embodiment of apparatus for practicing the present invention.

Referring now to FIGURE 5 of the drawings, there is shown a modified embodiment of apparatus for practicing the present invention. In this embodiment, the bulk density, acoustic travel time and resistivity signals from the downhole measuring devices are supplied to a photographic recorder 40 which is similar to the recorder 16 of FIGURE 2. In FIGURE 5, however, the bulk density signal $\rho_b$ and the acoustic travel time signal $\Delta t$ are also supplied to an analog computer 41. Computer 41 is also supplied with signals representative of the bulk density value $\rho_{sh}$ and the travel time value $\Delta t_{sh}$ for the shale material being encountered. The shale bulk density signal is obtained from a first signal supply means 42 which includes a battery 43 and a potentiometer 44. The shale travel time signal, on the other hand, is obtained from a second signal supply means 45 which includes a battery 46 and a potentiometer 47.

The analog computer 41 operates to automatically compute the simultaneous solution of Equations 6, 9 and 10 to provide output signals proportional to the shale fraction $p$, the sand porosity $\phi_{sd}$ and the effective porosity $\phi_e$. These computed signals are then supplied to the photographic recorder 40 for recording as additional traces on the recording medium therein.

The shale parameters $\rho_{sh}$ and $\Delta t_{sh}$ may be determined by making a preliminary run through the borehole 10 with the various measuring devices and with the computer 41 disconnected. The resulting photographic record from recorder 40 is then used to determine these shale values. The computer 41 is then reconnected into the system, the potentiometers 44 and 47 set at the proper values and a second run made through the borehole with the downhole measuring devices operating as before. The photographic record obtained during this second trip through the borehole includes the additional traces corresponding to the computed signal values, as well as those corresponding to the measured signal values.

Figure 6:
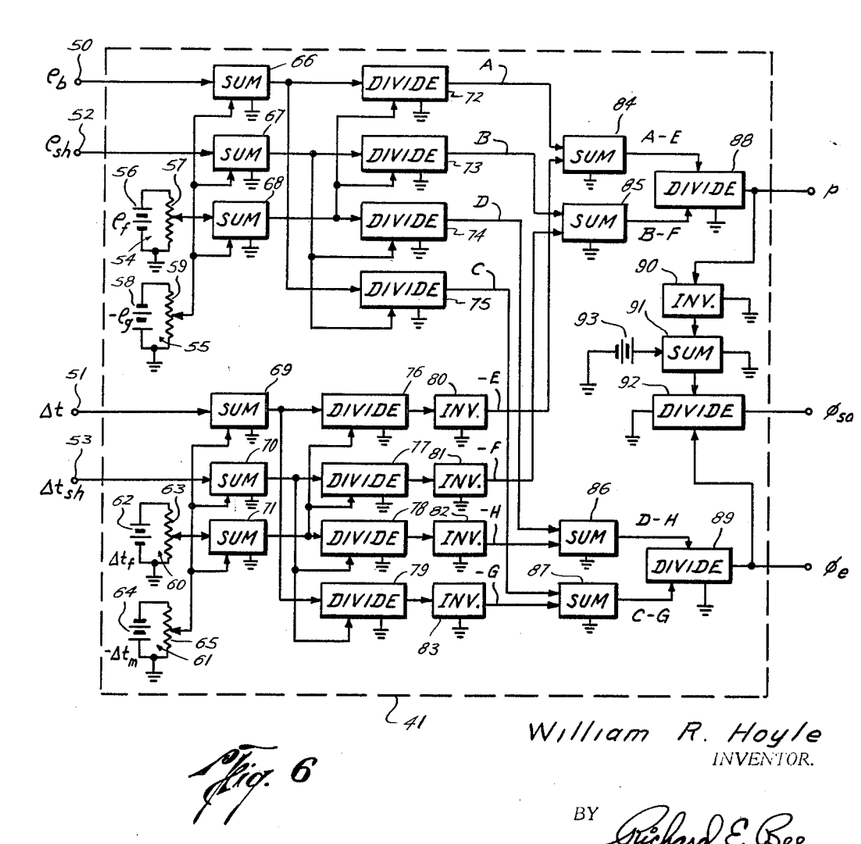
FIGURE 6 is a schematic block diagram showing in greater detail the computer of FIGURE 5.

Referring now to FIGURE 6 of the drawings, there is shown in greater detail a representative embodiment of computer circuits for the computer 41 of FIGURE 5. Solving the simultaneous relationships of Equations 6 and 9 for the shale fraction value "$p$," it can be shown that:

$$p = \frac{A-E}{B-F} \quad (11)$$

where $$A = \frac{\rho_b - \rho_g}{\rho_f - \rho_g} \quad E = \frac{\Delta t - \Delta t_m}{\Delta t_f - \Delta t_m}$$

$$B = \frac{\rho_{sh} - \rho_g}{\rho_f - \rho_g} \quad F = \frac{\Delta t_{sh} - \Delta t_m}{\Delta t_f - \Delta t_m}$$

Of course, by rearranging terms, Equation 11 can take many forms. For example, $p$ can be expressed in terms of the $\rho_b$ and $\Delta t$ parameters of Equation 11 as:

$$p = k_1 \rho_b - k_2 \Delta t - k_3 \quad (12)$$

where $$k_1 = \frac{\Delta t_f - \Delta t_m}{(\rho_{sh} - \rho_g)(\Delta t_f - \Delta t_m) - (\Delta t_{sh} - \Delta t_m)(\rho_f - \rho_g)}$$

$$k_2 = \frac{\rho_f - \rho_g}{(\rho_{sh} - \rho_g)(\Delta t_f - \Delta t_m) - (\Delta t_{sh} - \Delta t_m)(\rho_f - \rho_g)}$$

$$k_3 = \frac{\rho_g \Delta t_f - \rho_f \Delta t_m}{(\rho_{sh} - \rho_g)(\Delta t_f - \Delta t_m) - (\Delta t_{sh} - \Delta t_m)(\rho_f - \rho_g)}$$

Also, by combining Equations 6, 9 and 10 and solving for the effective porosity $\phi_e$, it can be shown that:

$$\phi_e = \frac{C-G}{D-H} \quad (13)$$

where $$C = \frac{\rho_b - \rho_g}{\rho_{sh} - \rho_g} \quad G = \frac{\Delta t - \Delta t_m}{\Delta t_{sh} - \Delta t_m}$$

$$D = \frac{\rho_f - \rho_g}{\rho_{sh} - \rho_g} \quad H = \frac{\Delta t_f - \Delta t_m}{\Delta t_{sh} - \Delta t_m}$$

The porosity $\phi_{sd}$ of the sand in the sand laminations can then be computed from the relationship of Equation 10.

Of course, by rearranging terms, Equation 13, can be expressed in terms of $\rho_b$ and $\Delta t$ as follows:

$$\phi_e = k_4 \rho_b - k_5 \Delta t - k_6 \quad (14)$$

where $$k_4 = \frac{\Delta t_{sh} - \Delta t_m}{(\rho_f - \rho_g)(\Delta t_{sh} - \Delta t_m) - (\Delta t_f - \Delta t_m)(\rho_{sh} - \rho_g)}$$

$$k_5 = \frac{\rho_{sh} - \rho_g}{(\rho_f - \rho_g)(\Delta t_{sh} - \Delta t_m) - (\Delta t_f - \Delta t_m)(\rho_{sh} - \rho_g)}$$

$$k_3 = \frac{\rho_g(\Delta t_{sh} - \Delta t_m) - \Delta t_m(\rho_{sh} - \rho_g)}{(\rho_f - \rho_g)(\Delta t_{sh} - \Delta t_m) - (\Delta t_f - \Delta t_m)(\rho_{sh} - \rho_g)}$$

The analog computer 41 of FIGURE 6 automatically solves Equations 11 and 13 and thus Equations 12 and 14, to obtain the values for the shale fraction $p$ and the effective porosity $\phi_e$. The computer 41 then combines the $p$ and $\phi_e$ values to obtain the sand porosity value $\phi_{sd}$ in accordance with the relationship of Equation 10.

As seen in FIGURE 6, the measurement signals $\rho_b$ and $\Delta t$ from the downhole measuring devices are supplied to input terminals 50 and 51. The signals representing the shale parameters $\rho_{sh}$ and $\Delta t_{sh}$ are supplied to input terminals 52 and 53. Signals representing the known parameters $\rho_f$ and $\rho_g$ are generated internally by signal supply means 54 and 55, respectively. The signal supply means 54 includes a battery 56 and a potentiometer 57, while the signal supply means 55 includes a battery 58 and a potentiometer 59. Signals representing the known parameters $\Delta t_f$ and $\Delta t_m$ are generated by signal supply means 60 and 61, respectively. Signal supply means 60 includes a battery 62 and a potentiometer 63, while signal supply means 61 includes a battery 64 and a potentiometer 63, while signal supply means 61 includes a battery 64 and a potentiometer 65. Potentiometers 57, 59, 63 and 65 are set to provide the proper values for the particular geographical region in which the borehole measurements are being made. Batteries 58 and 64 are poled so that the $\rho_g$ and $\Delta t_m$ signals are of negative polarity.

The various numerator and denominator factors making up the terms A through H of Equations 11 and 13 are formed by summing circuits 66 through 71. In each case, the summation is an algebraic summation. The terms A through H of Equations 11 and 13 are then formed by supplying these numerator and denominator factors from summing circuits 66 through 71 to the appropriate ones of signal dividing circuits 72 through 79. The outputs from the lower four dividing circuits 76 through 79 are individually passed through polarity inverter circuits 80–83 to provide the E, F, G and H signals with a negative polarity.

Appropriate pairs of the A through H signals, as indicated by Equations 11 and 13 are then supplied to summing circuits 84 through 87 to obtain the primary numerator and denominator terms of Equations 11 and 13. The resulting A–E and B–F output signals from the summing circuits 84 and 85 are supplied to a signal dividing circuit 88 to produce at the output thereof the desired shale fraction signal "$p$." Likewise, the D–H and C–G signals from the summing circuits 86 and 87 are supplied to a signal dividing circuit 89 to produce at the output terminal thereof a signal representing the effective porosity value $\phi_e$.

The shale fraction signal "$p$" is also supplied by way of a polarity inverter circuit 90 and a summing circuit 91 to a signal dividing circuit 92. A signal voltage representing a measurement value of unity is supplied by a battery 93 to a second input terminal of the summing circuit 91. As a consequence, the signal supplied to the dividing circuit 92 corresponds to the quantity ($1-p$). At the same time, the signal representing $\phi_e$ is supplied to a second input terminal of the dividing circuit 92. The dividing circuit 92 produces an output signal corresponding to the ratio of $\phi_e$ to ($1-p$). As indicated by Equation 10, this signal represents the sand porosity value $\phi_{sd}$.

The various summing circuits, dividing circuits and polarity inverter circuits shown in FIGURE 6 are preferably of the type employing operational amplifiers.

Figure 7A:
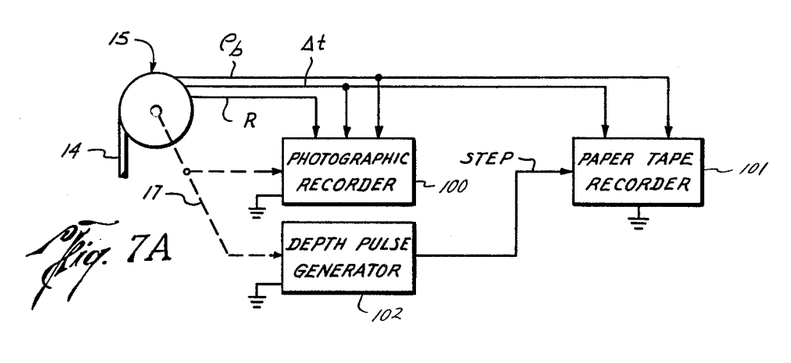
FIGURES 7A, 7B and 7C show different steps in a further method of practicing the present invention.
Figure 7B:
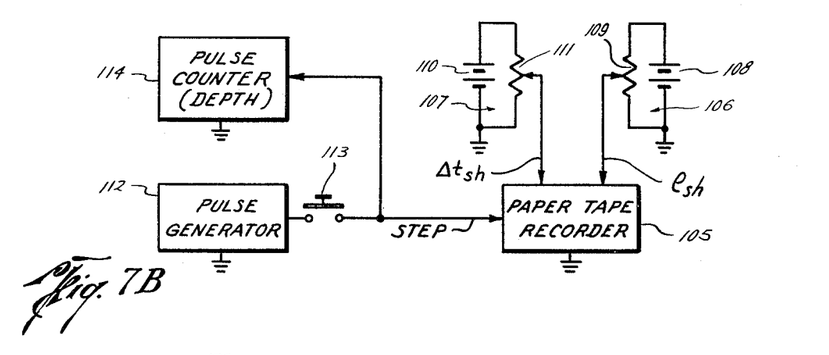
Figure 7C:
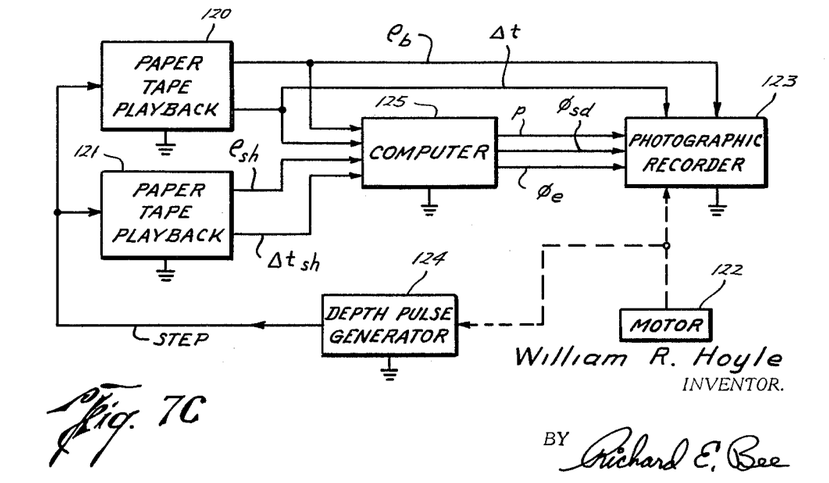

Referring now to FIGURES 7A, 7B and 7C, there will be described a further method of practicing the present invention. This method is particularly useful where it is desired to make only one trip through the borehole with the measuring devices and where, at the same time, there is insufficient prior knowledge or information concerning the shale parameters $\rho_{sh}$ and $\Delta t_{sh}$. It is also useful for those cases where the shale parameters are subject to considerable variation along the length of the borehole.

Referring first to FIGURE 7A, there is shown the apparatus which is used while the measuring devices are being moved through the borehole 10. In particular, the received measurement signals are supplied to a photographic recorder 100. The bulk density signal $\rho_b$ and the acoustic travel time signal $\Delta t$ are also supplied to a paper tape recorder 101 to produce a taped record of each of these signal values. The tape in the tape recorder 101 is advanced in step with the movement of the measurement devices through the borehole 10 by means of a depth pulse generator 102 which is driven by the mechanical linkage 17 which drives the film advancing mechanism in the recorder 100. Depth pulse generator 102 produces an output electrical impulse each time the subsurface measuring tool moves a prescribed vertical distance (e.g., one-half inch) in the borehole 10. Each such electrical impulse causes the tape recorder 101 to record a coded representation of the signal value on the paper tape. A suitable form of paper tape recorder as well as a suitable form of depth pulse generator for accomplishing these purposes are described in greater detail in U.S. Patent No. 3,329,931, granted to D. R. Tanguy on July 4, 1967, and entitled "Methods and Systems for Recording and Processing Well Logging Data."

After having obtained the photographic and paper tape records with the apparatus of FIGURE 7A, the apparatus of FIGURE 7B is then used to obtain a paper tape record of the shale parameters $\rho_{sh}$ and $\Delta t_{sh}$. This is done by examining the photographic record obtained with the apparatus of FIGURE 7A and entering the appropriate shale parameter values on a second paper tape by means of a paper tape recorder 105 as shown in FIGURE 7B. The signals representing the shale parameters $\rho_{sh}$ and $\Delta t_{sh}$, are obtained from signal supply means 106 and 107, respectively. Signal supply means 106 includes a battery 108 and a potentiometer 109, while the signal supply means 107 includes a battery 110 and a potentiometer 111.

The paper tape in the recorder 105 is advanced in the desired step-by-step manner by means of pulses supplied thereto by a pulse generator 112 whenever a push-button switch 113 is depressed. These pulses are also supplied to a pulse counter 114. Since each step of the paper tape represents a given distance in the borehole, the pulses counted by the counter 114 enable the operator to keep track of the borehole depth for the signals being recorded on the paper tape.

In operation, the potentiometers 109 and 111 are set to provide signals proportional to the shale parameters $\rho_{sh}$ and $\Delta t_{sh}$ as read from the photographic record previously obtained. At the same time, the paper tape in the recorder 105 is advanced in a step-by-step manner whenever the push-button switch 113 is depressed. In this manner, a paper tape is produced which has recorded thereon the shale parameters as a function of depth in the borehole.

After obtaining the two paper tape records, the apparatus shown in FIGURE 7C is then used to produce the photographic record having the desired computed values. In particular, the two paper tape records are placed on different ones of a pair of paper tape playback units 120 and 121. The paper tapes are aligned so that they will start at the same borehole depth. An electric motor 122 is used to drive a photographic recorder 123 and a depth pulse generator 124. This advances the photographic recording medium in the recorder 123 and, at the same time, causes the depth pulse generator to produce electrical output pulses representing increments of borehole depth. These pulses are supplied to the drive mechanisms of the paper tape playback units 120 and 121 to advance the two paper tapes in step with one another.

As the tapes are advanced, the playback units 120 and 121 produce at the output terminals thereof the previously recorded measurement signals $\rho_b$ and $\Delta t$ and shale parameter signals $\rho_{sh}$ and $\Delta t_{sh}$. These signals are supplied to the input of a computer 125. Computer 125 operates to solve Equations 6, 9 and 10 to provide the desired computed signals "$p$," $\phi_{sd}$ and $\phi_e$. These computed signals are then supplied to the photographic recorder 123 to produce corresponding traces on the recording medium thereof. At the same time, the original $\rho_b$ and $\Delta t$ signals from the tape playback unit 120 are also supplied to the recorder 123 to produce traces thereon corresponding to such original signals. Photographic recorder 123 thus produces a multi-trace record similar to that produced by the recorder 40 of FIGURE 5.

The paper tape playback units 120 and 121 of FIGURE 7C may be constructed in the manner described in greater detail in the above-mentioned U.S. Patent No. 3,329,931, granted July 4, 1967. Computer 125 may take the form described in greater detail in FIGURE 6 herein. Since similar units appear in more than one of FIGURES 7A, 7B and 7C, it should be understood that the same physical unit may be used in different ones of the steps of FIGURES 7A, 7B and 7C. For example, the photographic recorder 100 of FIGURE 7A may be the same physical piece of equipment as is used for the photographic recorder 123 in the step of FIGURE 7C.

From the foregoing descriptions of the various embodiments of the invention, it is seen that the methods of the present invention enable a quantitative determination of the amount of shale present in subsurface earth formations in a relatively rapid yet highly accurate manner. In addition, the effective porosity and sand porosity values of the subsurface formations can be determined simultaneously therewith and with the same ease and efficiency. Also, a very similar graphical analysis and/or computer as described above could be utilized to determine the clay content and porosity for the dispersed clay model shown in an article entitled "Formation Density Log Applications in Liquid-Filled Holes" found in the March 1963 issue of the Journal of Petroleum Technology.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating earth formations traversed by a borehole comprising:
    exploring means for deriving a first signal representative of the bulk density of a formation surrounding a borehole;
    exploring means for deriving a second signal representative of the velocity of acoustic waves propagating through said formation; and
    means responsive to said first and second signals for non-multiplicatively combining a function of the first signal with a function of the second signal to provide an output signal which is representative of the shale or clay content of said formation.

2. Apparatus for investigating earth formations traversed by a borehole comprising:
    exploring means for deriving a first signal representative of the bulk density of a formation surrounding a borehole;
    exploring means for deriving a second signal representative of the velocity of acoustic waves propagating through said formation; and
    means responsive to said first and second signals for subtracting a function of the second signal from a function of the first signal to provide an output signal representative of the shale or clay content of said formation.

3. Apparatus for investigating earth formations traversed by a borehole comprising:
    exploring means for deriving a first signal representative of the bulk density of a formation surrounding a borehole;
    exploring means for deriving a second signal representative of the velocity of acoustic waves propagating through said formation; generating means for generating a plurality of signals representative of known quantities, said generating means including:
    means for generating a signal representative of the fluid density of said formation, said fluid density being a known quantity and
    means for generating a signal representative of the acoustical velocity through the fluids in said formation, said fluid velocity being a known quantity; and
    means responsive to said first and second derived signals and said generated signals for combining said signals in accordance with a predetermined relationship to provide an output signal representative of the shale or clay content of said formation.

4. Apparatus for investigating earth formations traversed by a borehole comprising:
- exploring means for deriving a first signal representative of the bulk density of a formation surrounding a borehole;
- exploring means for deriving a second signal representative of the velocity of acoustic waves propagating through said formation; generating means for generating a plurality of signals representative of known quantities, said generating means including:
  - means for generating a signal representative of the density of the sand phase of said formation, said sand density being a known quantity and
  - means for generating a signal representative of the acoustical velocity through the sand phase of said formation, said sand velocity being a known quantity; and
  - means responsive to said first and second derived signals and said generated signals for combining said signals in accordance with a predetermined relationship to provide an output signal representative of the shale or clay content of said formation.

5. Apparatus for investigating earth formations traversed by a borehole comprising:
- exploring means for deriving a first signal representative of the bulk density of a formation surrounding a borehole;
- exploring means for deriving a second representative of the velocity of acoustic waves propagating through said formation; generating means for generating a plurality of signals representative of known quantities, said generating means including:
  - means for generating a signal representative of the fluid density of said formation, said fluid density being a known quantity,
  - means for generating a signal representative of the acoustical velocity through the fluids in said formation, said fluid velocity being a known quantity,
  - means for generating a signal representative of the density of the sand phase of said formation, said sand density being a known quantity, and
  - means for generating a signal representative of the acoustical velocity of the sand phase of said formation, said sand velocity being a known quantity; and
  - means responsive to said first and second derived signals and said generated signals for combining said signals in accordance with a predetermined relationship to provide an output signal representative of the shale or clay content of said formation.

6. Apparatus for investigating earth formations traversed by a borehole comprising:
- exploring means for deriving a first signal representative of the bulk density of a formation surrounding a borehole;
- exploring means for deriving a second signal representative of the velocity of acoustic waves propagating through said formation; and
- means responsive to said first and second signals for non-multiplicatively combining a function of the first signal with a function of the second signal to provide an output signal which is representative of the porosity of said formation.

7. Apparatus for investigating earth formations traversed by a borehole comprising:
- exploring means for deriving a first signal representative of the bulk density of a formation surrounding a borehole;
- exploring means for deriving a second signal representative of the velocity of acoustic waves propagating through said formation; generating means for generating a plurality of signals representative of known quantities, said generating means including:
  - means for generating a signal representative of the fluid density of said formation, said fluid density being a known quantity and
  - means for generating a signal representative of the acoustical velocity through the fluids in said formation, said fluid velocity being a known quantity; and
  - means responsive to said first and second derived signals and said generating signals for combining said signals in accordance with a predetermined relationship to provide an output signal representative of the porosity of said formation.

8. Apparatus for investigating earth formations traversed by a borehole comprising:
- exploring means for deriving a first signal representative of the bulk density of a formation surrounding a borehole;
- exploring means for deriving a second signal representative of the velocity of acoustic waves propagating through said formation;
- means for generating a plurality of signals representative of known quantities, said means including:
  - means for generating a signal representative of the fluid density of said formation, said fluid density being a known quantity,
  - means for generating a signal representative of the acoustical velocity through the fluids in said formation, said fluid velocity being a known quantity,
  - means for generating a signal representative of the density of the sand phase of said formation, said sand density being a known quantity, and
  - means for generating a signal representative of the acoustic velocity through the sand phase of said formation, said sand velocity being a known quantity; and
  - means responsive to said derived first and second signals and said generating signals for combining said signals in accordance with a predetermined relationship to provide an output signal representative of the porosity of said formation.

9. Apparatus for investigating earth formations traversed by a borehole comprising:
- exploring means for deriving a first signal representative of the bulk density of a formation surrounding a borehole;
- exploring means for deriving a second signal representative of the velocity of acoustic waves propagating through said formation;
- means for generating a plurality of signals representative of known quantities, said means including:
- means for generating a signal representative of the fluid density of said formation, said fluid density being a known quantity,
- means for generating a signal representative of the acoustical velocity through the fluids in said formation, said fluid velocity being a known quantity,
- means for generating a signal representative of the density of the sand phase of said formation, said sand density being a known quantity,
- means for generating a signal representative of the acoustic velocity through the sand phase of said formation, said sand velocity being a known quantity,
- means for generating a signal representative of the acoustic velocity of the shale or clay phase of said formation, and
- means for generating a signal representative of the density of the shale or clay phase of said formation; and
- means responsive to said derived first and second signals and said generated signal for combining said signals in accordance with a predetermined relationship to provide an output signal representative of a characteristic of said formation.

10. Apparatus for investigating earth formations traversed by a borehole comprising:
   exploring means for deriving a first signal representative of the bulk density $\rho_b$ of a formation surrounding a borehole;
   exploring means for deriving a second signal representative of the travel time $\Delta_t$ of acoustic waves propagating through said formation; and
   means responsive to said first and second signals for combining said signals in accordance with the relationship $$p = k_1 \rho_b - k_2 \Delta t - k_3$$

to provide an output signal representative of the shale or clay content $p$ of said formation, where $k_1$, $k_2$ and $k_3$ are constants representative of known parameters of the formation.

11. A method of investigating earth formations traversed by a borehole comprising:
   deriving a first signal representative of the first bulk density of a formation surrounding a borehole;
   deriving a second signal representative of the velocity of acoustic waves propagating through said formation; and
   subtracting a function of the second signal from a function of the first signal to provide an output signal representative of the shale or clay content of said formation.

12. A method of investigating earth formations traversed by a borehole comprising:
   deriving a first signal representative of the bulk density of a formation surrounding a borehole;
   deriving a second signal representative of the velocity of acoustic waves propagating through said formation;
   generating a plurality of signals representative of known quantities, including:
   generating a signal representative of the fluid density of said formation, said fluid density being a known quantity, and
   generating a signal representative of the acoustic velocity through the fluids in said formation, said fluid velocity being a known quantity; and
   combining said first and second derived signas and said generated signals in accordance with a predetermined relationship to provide an output signal representative of the shale or clay content of said formation.

13. A method of investigating earth formations traversed by a borehole comprising:
   deriving a first signal representative of the bulk density of a formation surrounding a borehole;
   deriving a second signal representattive of the velocity of acoustic waves propagating through said formation;
   generating a plurality of signals representative of known quantities, including:
   generating a signal representative of the density of the sand phase of said formation, said sand density being a known quantity, and
   generating a signal representative of the acoustic velocity through the sand phase of said formation, said velocity being a known quantity; and
   combining said first and second derived signals and said generated signals in accordance with a predetermined relationship to provide an output signal representative of the shale or clay content of said formation.

14. A method of investigating earth formations traversed by a borehole comprising:
   deriving a first signal representative of the bulk density of a formation surrounding a borehole;
   deriving a second signal representative of the velocity of acoustic waves propagating through said formation;
   generating a plurality of signals representative of known quantities, including:
   generating a signal representative of the fluid density of said formation, said fluid density being a known quantity,
   generating a signal representative of the acoustic velocity through the fluids in said formation, said fluid velocity being a known quantity,
   generating a signal representative of the density of the sand phase of said formation, said sand density being a known quantity, and
   generating a signal representative of the acoustic velocity of the sand phase of said formation, said sand velocity being a known quantity; and
   combining said first and second derived signals and said generated signals in accordance with a predetermined relationship to provide an output signal representative of the shale or clay content of said formation.

15. A method of investigating earth formations traversed by a borehole comprising:
   deriving a first signal representative of the bulk density of a formation surrounding a borehole;
   deriving a second signal representative of the velocity of acoustic waves propagating through said formation;
   generating a plurality of signals representative of known quantities, including:
   generating a signal representative of the fluid density of said formation, said fluid density being a known quantity, and
   generating a signal representative of the acoustic velocity through the fluids in said formation, said fluid velocity being a known quantity; and
   combining said first and second derived signals and said generated signals in accordance with a predetermined relationship to provide an output signal representative of the porosity of said formation.

16. A method of investigating earth formations traversed by a borehole comprising:
   deriving a first signal representative of the bulk density of a formation surrounding a borehole;
   deriving a second signal representative of the velocity of acoustic waves propagating through said formation;
   generating a plurality of signals representative of known quantities, including:
   generating a signal representative of the fluid density of said formation, said fluid density being a known quantity,
   generating a signal representative of the acoustic velocity through the fluids in said formation, said fluid velocity being a known quantity,
   generating a signal representative of the density of the sand phase of said formation, said sand density being a known quantity, and
   generating a signal representative of the acoustic velocity through the sand phase of said formation, said sand velocity being a known quantity; and
   combining said derived first and second signals and said generated signals in accordance with a predetermined relationship to provide an output signal representative of the porosity of said formation.

17. A method of investigating earth formations traversed by a borehole comprising:
   deriving a first signal representative of the bulk density of a formation surrounding a borehole;
   deriving a second signal representative of the velocity of acoustic waves propagating through said formation;

generating a plurality of signals representative of known quantities, including:

generating a signal representative of the fluid density of said formation, said fluid density being a known quantity, generating a signal representative of the acoustic velocity through the fluids in said formation, said fluid velocity being a known quantity, generating a signal representative of the density of the sand phase of said formation, said sand density being a known quantity, generating a signal representative of the acoustic velocity through the sand phase of said formation, said sand velocity being a known quantity, generating a signal representative of the acoustic velocity of the shale or clay phase of said formation, and generating a signal representative of the density of the shale or clay phase of said formation; and combining said derived first and second signals and said generated signals in accordance with a predetermined relationship to provide an output signal representative of a characteristic of said formation.

References Cited

UNITED STATES PATENTS

| | | | |
|---|---|---|---|
| 3,127,950 | 4/1964 | Itria | 73—152 X |
| 3,311,876 | 3/1967 | Lee | 73—151 X |

JERRY W. MYRACLE, Primary Examiner

U.S. Cl. X.R.

324—6